US006247258B1

(12) United States Patent
O'Malley

(10) Patent No.: US 6,247,258 B1
(45) Date of Patent: Jun. 19, 2001

(54) TOPPLE RESISTANT, MODULAR AND MOBILE SIGNAGE SYSTEM

(76) Inventor: John O'Malley, Market Interiors Incorporated 329 W. 18$^{th}$ St., Chicago, IL (US) 60616

(*) Notice: Subject to any disclaimer, the term of this patent is extended or adjusted under 35 U.S.C. 154(b) by 0 days.

(21) Appl. No.: 09/251,178

(22) Filed: Feb. 17, 1999

Related U.S. Application Data

(60) Provisional application No. 60/099,559, filed on Sep. 9, 1998.

(51) Int. Cl.$^{7}$ ..................................................... G06F 15/00

(52) U.S. Cl. ................................ 40/606; 40/610; 40/612; 40/624

(58) Field of Search ............................. 40/606, 610, 612, 40/624, 452, 538; 362/351.13; 248/650, 677, 680; 280/763.1, 764.1, 765.1, 766.1, 768; 254/323; D20/29; 52/169.12

(56) References Cited

U.S. PATENT DOCUMENTS

| | | | | |
|---|---|---|---|---|
| 926,186 | | 6/1909 | Heales et al. . | |
| 1,906,762 | | 5/1933 | Maynes . | |
| 3,216,741 | | 11/1965 | Newlin et al. . | |
| 3,702,033 | | 11/1972 | Coleman . | |
| 3,798,814 | | 3/1974 | Harmon . | |
| 4,077,144 | * | 3/1978 | Smits | 40/610 X |
| 4,516,344 | | 5/1985 | Seely . | |
| 4,543,905 | * | 10/1985 | McKenney | 40/612 X |
| 4,583,311 | | 4/1986 | Hosey et al. . | |
| 5,038,506 | | 8/1991 | Liljeqvist et al. . | |
| 5,172,505 | | 12/1992 | Borsella . | |
| 5,192,944 | | 3/1993 | Otsuki . | |
| 5,220,740 | | 6/1993 | Brault . | |
| 5,307,580 | | 5/1994 | Farmer . | |
| 5,329,875 | | 7/1994 | Feuvray . | |
| 5,379,540 | | 1/1995 | Howard . | |
| 5,493,292 | * | 2/1996 | Fanslow et al. | 40/612 X |
| 5,542,203 | * | 8/1996 | Luoma et al. | 40/610 |
| 5,618,141 | | 4/1997 | Field . | |
| 5,636,462 | * | 6/1997 | Kleiman | 40/452 |
| 5,666,751 | | 9/1997 | Garfinkle . | |

* cited by examiner

*Primary Examiner*—Terry Lee Melius
*Assistant Examiner*—James M Hewitt
(74) *Attorney, Agent, or Firm*—James A. Geppert

(57) ABSTRACT

A modular, mobile sign assembly which has the appearance of a permanent installation including a base module formed of a frame with a set of height-adjustable support posts and a pair of wheels on an axle for movement of the unit between locations, and a display module mounted on the base module providing a lighted sign with display panels having a battery of fluorescent lighting tubes within the sign and a message formed of letters or tiles through which the light projects, and an electrical source, either self-contained by the use of batteries or solar panels or by connection to a remote electrical source. The base module is provided with an appearance of permanence by the use of fascia support panels which are mounted to depend from the upper edge of the base frame to adjacent the ground and removable horizontal panel sections which cover the upper surface of the base module and form seating thereon.

9 Claims, 7 Drawing Sheets

TOPPLE RESISTANT, MODULAR AND MOBILE SIGNAGE SYSTEM

Reference is made to applicant's provisional patent application No. 60/099,559 filed Sep. 9, 1998, benefit of which is claimed under 35 U.S.C. 119(e).

BACKGROUND

Invention relates to a topple resistant, modular and mobile signage system, that is non-permanent and promotes a visual effect of a permanent construction. Another aspect of the present invention is that it can make use of solar power when supporting LED display.

Many municipalities are now requiring low profile signage construction, while banning the use of temporary type signs. This invention while being modular and mobile maintains the appearance of a low profile, permanent construction. This invention with the feature of modularity provides a flexibility of marketing and maintenance that permanent sign constructions do not have. This invention with the mobility provides the ability to adapt to the fluid location requirements as dictated by changeable, market demands and ordinance laws. Inherent to the signage systems modularity is the accessibility for an adjustment to a plurality of adjustable support posts. This allows the display module in attachment to the base module to be properly leveled to the ground while providing proper load distribution.

There is a need for a signage system that can quickly respond to the dynamic changes associated market needs, while providing the aesthetic requirements of modern municipal signage ordinance. There is a need for a signage system that is non-permanent, to be topple resistant so as to provide the safety of a permanent sign construction while providing the aesthetics of a permanent sign construction. This topple resistance provides a safety feature that substantially resists overturning moments generated by a strong wind load. By integrating the low profile requirements into the design of the signage system it becomes inherently topple resistant by virtue of the geometric displacement of the base module. There is no outwardly visible hold down mechanism that would violate the appearance of a permanent sign construction.

There is a need for a solar power option that would provide an environmentally beneficial power supply for the use of a light emitting diode (LED) display that can be made integral to the display module. This would eliminate the requirement of bringing power to the signage system. Pluralities of solar panels are located in such a way so as to allow exposure to the sun while remaining obscure from ordinary view. This obscurity of the solar panels further promotes the appearance of a permanent sign construction.

SUMMARY

The present invention relates to a signage system that is topple resistant, modular and mobile.

A principal object and advantage of the present invention is that with all of the inherent topple resistance, interchangeability and mobility, the signage system provides the visual effect of a permanent type signage construction. Another object and advantage of the present invention is the option of a solar power supply. The integral solar cells and battery of the base module would provide a clean source of power for the display module.

Another object and advantage of the present invention is the ease of access to the height adjustment mechanisms located within the confinement of the base module. That access is gained through an approach provided by the hinged cap panels. The access can also be secured by means of a padlock.

Another object and advantage of the present invention is that a signage system that was being used outdoors could be made for use indoors, as in the case of an enclosed shopping mall. By removing the plurality of panel sections, one would thereby gain access to the support claw feet that are designated for earthen support. One would simply change the clawed feet to flat bearing support feet.

DETAILED DESCRIPTION OF THE PREFERRED EMBODIMENTS

Figure 1:
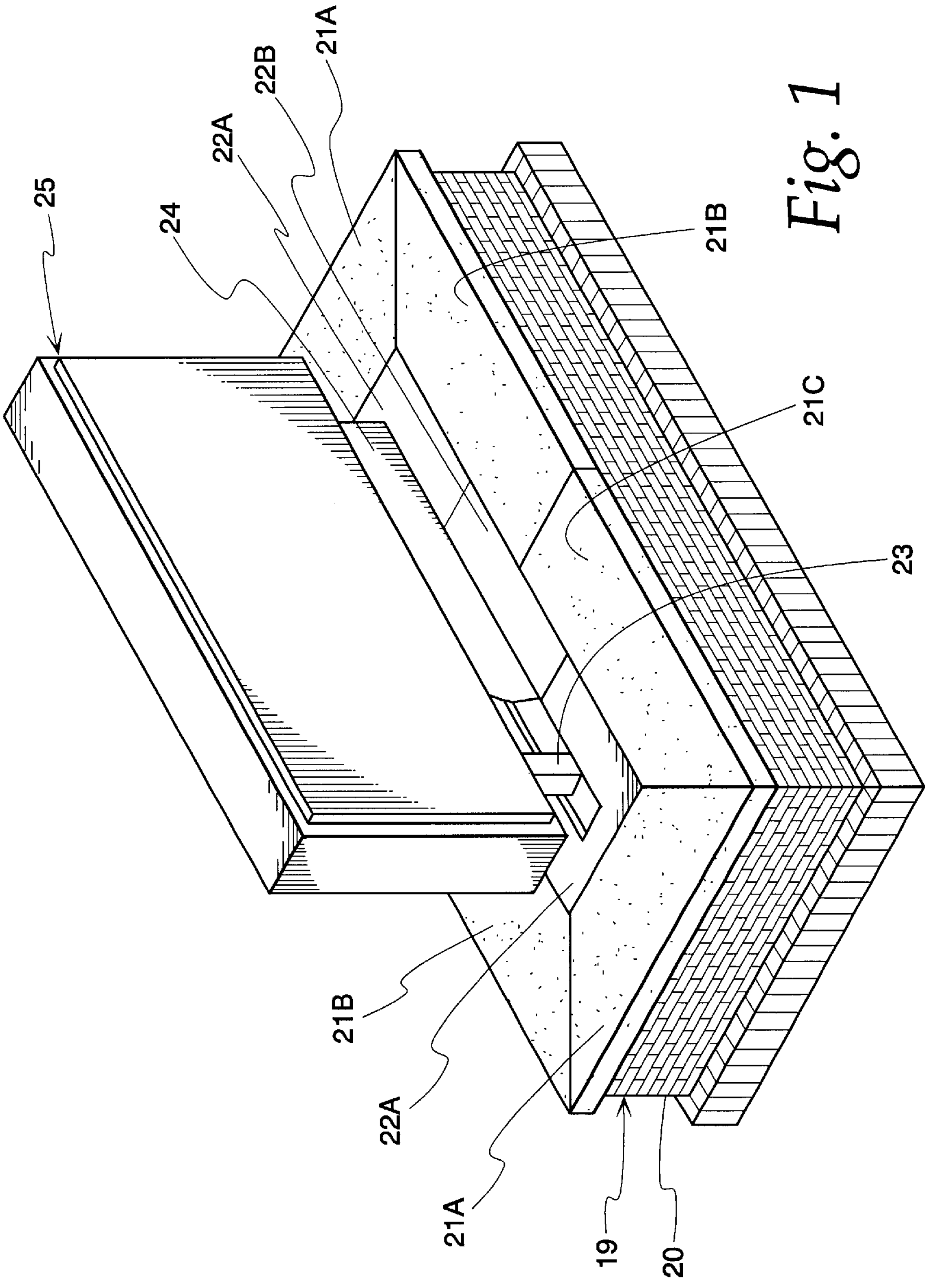
FIG. 1 is a isometric drawing depicting the assembly of a topple resistant, modular and mobile signage assembly.
Figure 2A:
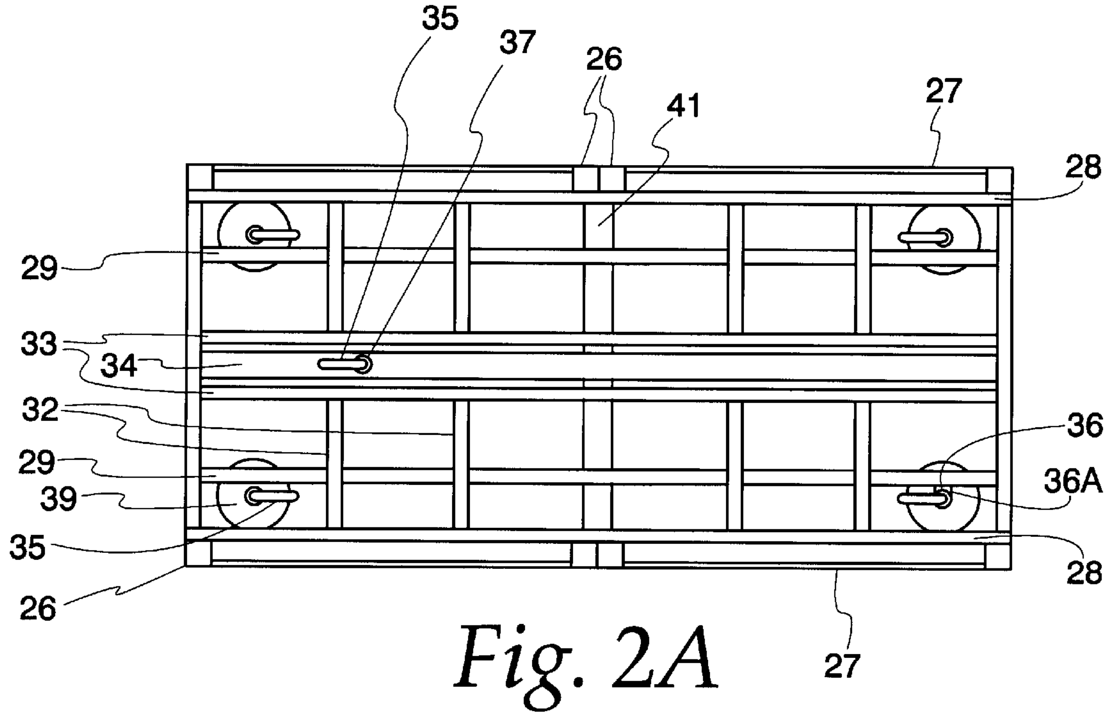
FIG. 2A is a top view of the base module's structural sub-assembly.
Figure 2B:
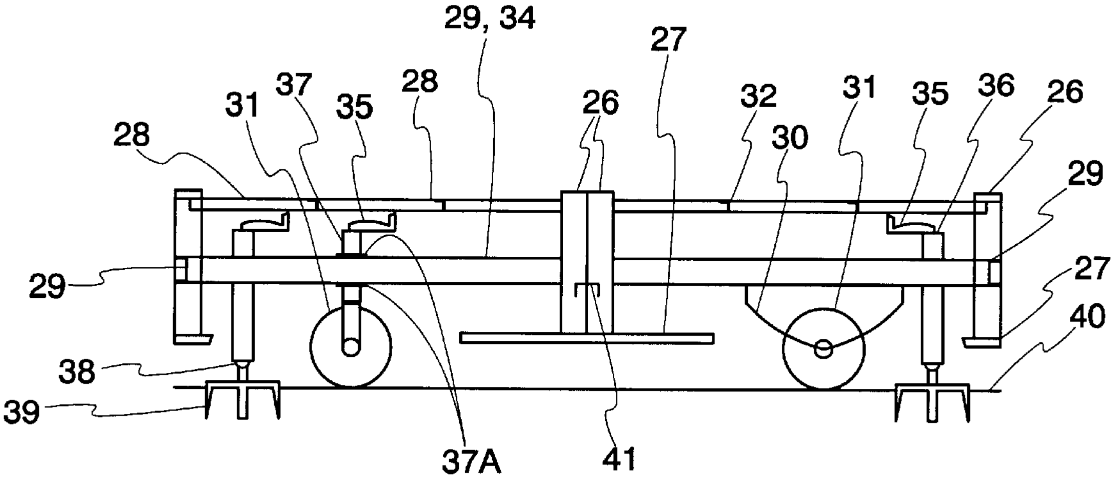
FIG. 2B is an elevation view of the base module's structural sub-assembly.
Figure 5:
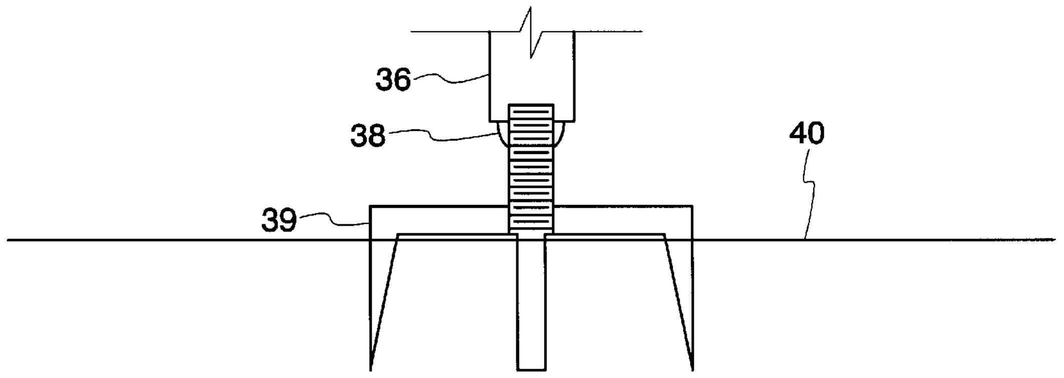
FIG. 5 is an elevation view of a height adjustment sub-assembly.

The present invention as described here embodies a topple resistant modular and mobile signage assembly. The signage assembly can be for outside and inside use. The signage assembly as presented here is for an outside application. This signage assembly as presented on FIG. 1 exhibits an electrically illuminated display module 25. Sign module 25 is coupled to base module 19, by means of column attachment 23. The brick fascia panels 20, along with the painted top panel section 21A, 21B, 21C create an illusion of permanence. FIG. 2A represents the top view of the structural frame to the base module assembly, FIG. 2B represents an elevation view of the structural frame to the base module. As indicated in FIGS. 2A/2B there is a boxed sub-assembly consisting of eight posts 26 the perimeter of the box is connected together by means of standard structural shapes. Post members 26 are connected at the top portion by angle shaped side and end members 28. Post members 26 are connected at the mid portion by channel or rectangular box section shaped member 29. Post members 26 are connected at the bottom portion by a smaller section of angle or flat stock shaped member 27. All of the before mentioned post 26 and shaped members 27, 28, 29 can be of a metal construction. The internal structural sub-assembly of the base module as indicated FIG. 2A, has a top cross bracing 32 which is of a standard structural shape such as an angle, channel or box section so as to accommodate the required strength, this cross bracing 32 is connected to perimeter angle shaped member 28 and 33. Also, cross brace 41 is located between central pairs of posts 26, 26. Component 33 is of standard structural shape such as an angle, channel or box section that in turn connected to the end perimeter angle shaped members 28. All structural components are of a metal construction. All structural joint connections will be provided by threaded bolt and nut fasteners and when appropriate joint connections will be of a welded connection. A plurality of height adjustment and leveling devices 36, 39 as shown on drawing(s) FIG. 2A/2B, FIG. 5 are attached to horizontal structural members 29. The height adjustment devices are normal to and are in bearing contact with an earthen surface 40. FIG. 5 illustrates a claw-leveling device attachment 39 attached to a height adjustment device 36. Height adjustment device 36, has a cylinder shaped arrangement and is connected to 29 by means of u-bolt fastener sub-assembly 36A. There are a total of four, height adjustment and leveling devices, as indicated in FIGS. 2A/2B. Height adjustment device 36 is a commercially procured screw jack that is actuated by a handle 35. The turning of handle 35 induces the threaded mechanism internal to 36 to push or pull a separately male threaded shaft extension located at the end opposite to the handled end. This push and or pulling action provides the means to raise and lower the attached frame. This male threaded extension, is attached to a female threaded receptacle of a swivel joint 38. Swivel joint 38 is a commercially procured device and has two female threaded receptacles one of which as previously indicated is connected to 36, the other receptacle is attached to a male threaded connection of a claw leveling foot 39. Claw leveling foot 39 is of a cast metal fabrication and has formed spikes integral to the casting. This spike arrangement can be pushed into the ground 40 by the transfer of load from the signage assembly and into the claw-leveling device.

Figure 4:
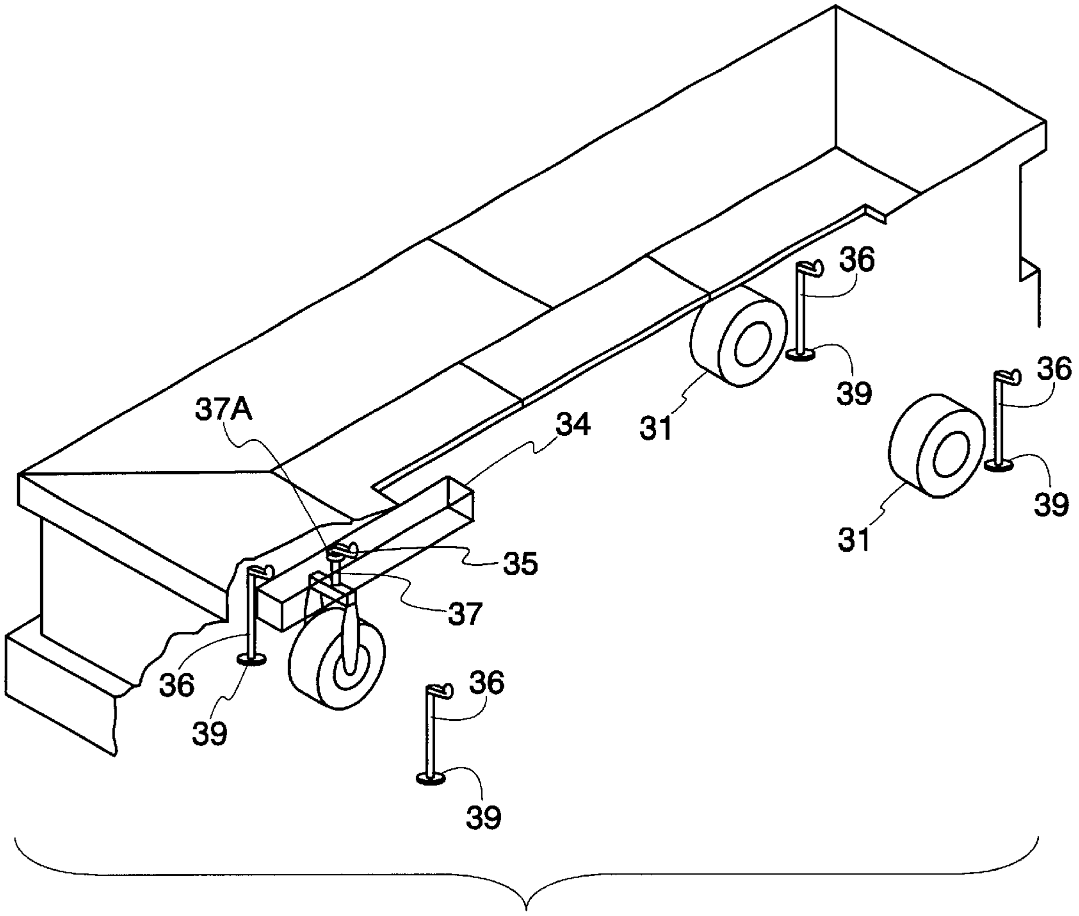
FIG. 4 is an isometric view of the base module assembly, with a cut away revealing the relative location of the wheels and the leveling claws.

The function of claw foot 39 as indicated, is to become embedded into the surface of earthen ground 40. The spiked configuration once embedded will resist lateral movement, thereby reinforcing the position of the signage assembly against destabilizing forces such as wind. This mechanism adds to the resistance to topple in that rotation is resisted. This swivel joint connection 38 is able to cause the claw foot 39 to conform to different angles of contact with the ground 40. The earthen contact surface 40 to the bearing contact surface of 39 will be of sufficient area so as to properly transfer its proportioned load. This contact area will be sized according to the soil bearing requirements of the particular location so as to distribute the load properly to the soil-bearing plane. The raising and lowering mechanism 36 coupled with the conformity characteristics of the swivel joint 38 and claw foot 39, create a stable terrain adhering, yet adaptable positioning capability for the signage assembly FIG. 2B along with FIG. 4 indicates the location of the claw leveling assemblies and the wheel assemblies 30, 31, 35, 37. There will be at least three wheel sub-assemblies provided internal to a base module 19. The wheel sub-assemblies will provide the mobility of the over all module signage assembly. The arrangement as shown on FIG. 2B and FIG. 4 indicates a preferred arrangement but does not represent the only arrangement available. In that a total of three wheels are shown, more wheels may be required to provide better load distribution and transfer for soil bearing requirements. Two wheel sub-assemblies 30, 31 are indicated in FIG. 4. A leaf spring axle sub-assembly 30 and a wheel 31 are attached to a structural shaped member 29. Leaf spring axle sub-assembly 30 and a wheel 31 are commercially procured.

This attachment of leaf spring axle sub-assembly 30 onto a structural shaped member 29, may be of a welded or bolted construction. Leaf spring sub-assembly 30 is of a metal construction and wheel 31 is of a rubber construction, which may or may not be inflatable. The wheel assembly 37, 31 is a wheeled assembly that offers adjustability of height of the base module with respect to the wheel contacted ground 31/40. This provides a flexibility in the control of the height frame at one end relative to the surface of the ground. This would be used to compensate for any interference of pitch that might arise from loading or unloading the assembly onto a ramp.

This wheel height adjustable assembly 37 is similar to construction and function to the height adjustment device 36. Assembly 37 is a commercially procured device that is attached to a structural shaped member 34 of the module base assembly. Wheel assembly 37 is positioned through structural shaped member 34 and is permanently fixed by means of a locking collar 37A onto both sides of structural shaped member 34 as indicated on FIG. 2B.

Figure 11:
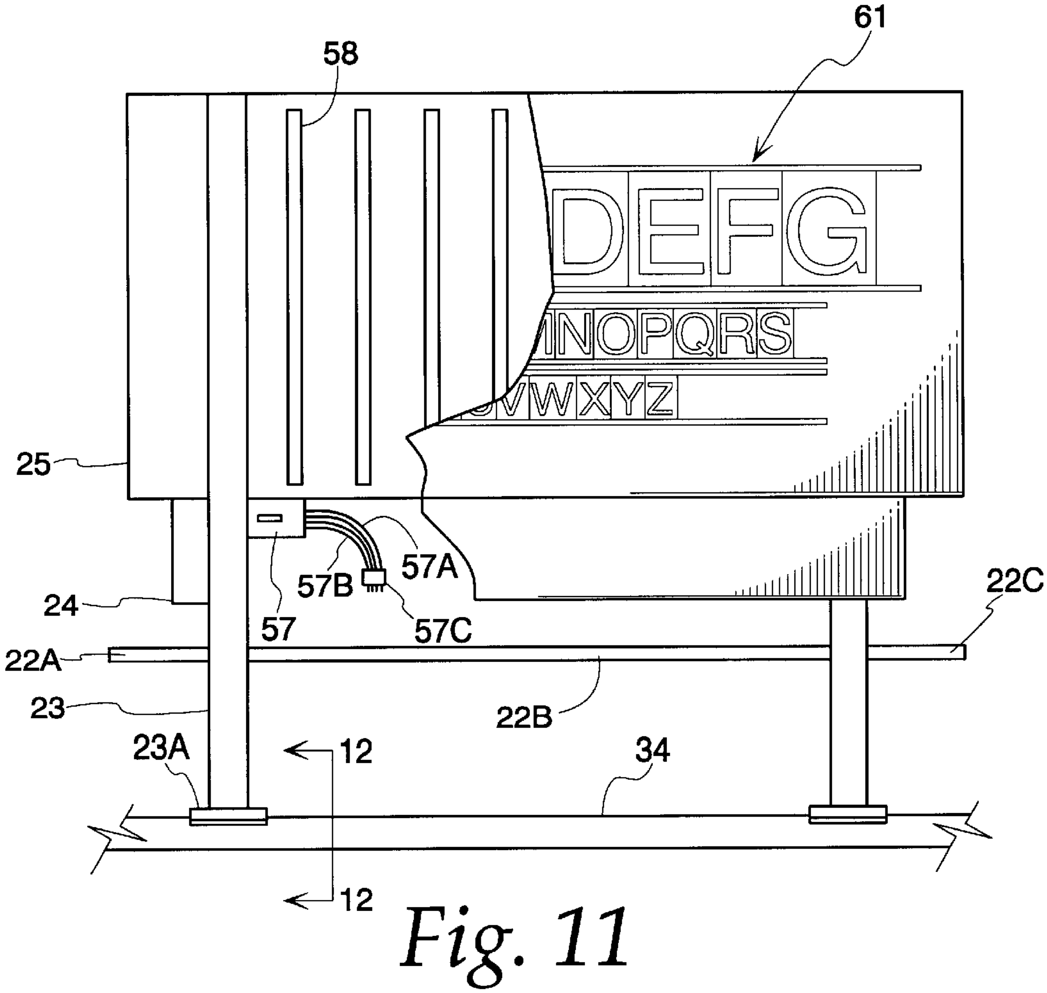
FIG. 11 is a sectioned elevation view of the display module attached to the base module support member.
Figure 12:
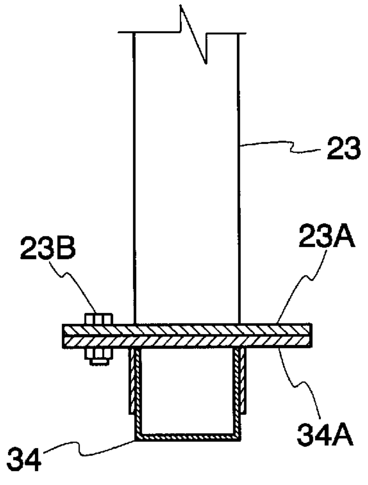
FIG. 12 is a vertical section of FIG. 11, in elevation and taken on the line 12—12 of FIG. 11 showing the coupling mechanism of the display module post onto the base module support member.

Wheel assembly 37 is positioned through structural shaped member 34 and is permanently fixed by means of a locking collar 37A. The outside body of assembly 37 is cylindrical in shape and can have a machined groove connection so as to accommodate a seated connection for locking collar 37A. Locking collar 37A would be of a split collar configuration that would be connected into position within the machined grove seat. Locking collar 37A could have a sufficient inside diameter so as to allow the body of the mechanism to slide through for proper positioning and welding. This height adjustable wheel assembly 37 would be of similar mechanism of the claw leveling mechanism 36, in that it would be adjustable by turning handle 35. Structural shaped member 34 is of a square box tubular configuration. The ends are supported at a connection to structural shape 29. Structural shaped member 34 is also supported at the center of the span by structural shape 41. This reinforces the support for the load transfer requirements of the height adjustable wheel assembly 37 and load bearing requirement as transferred from 23, as indicated in FIG. 11 and FIG. 12.

Figure 3:
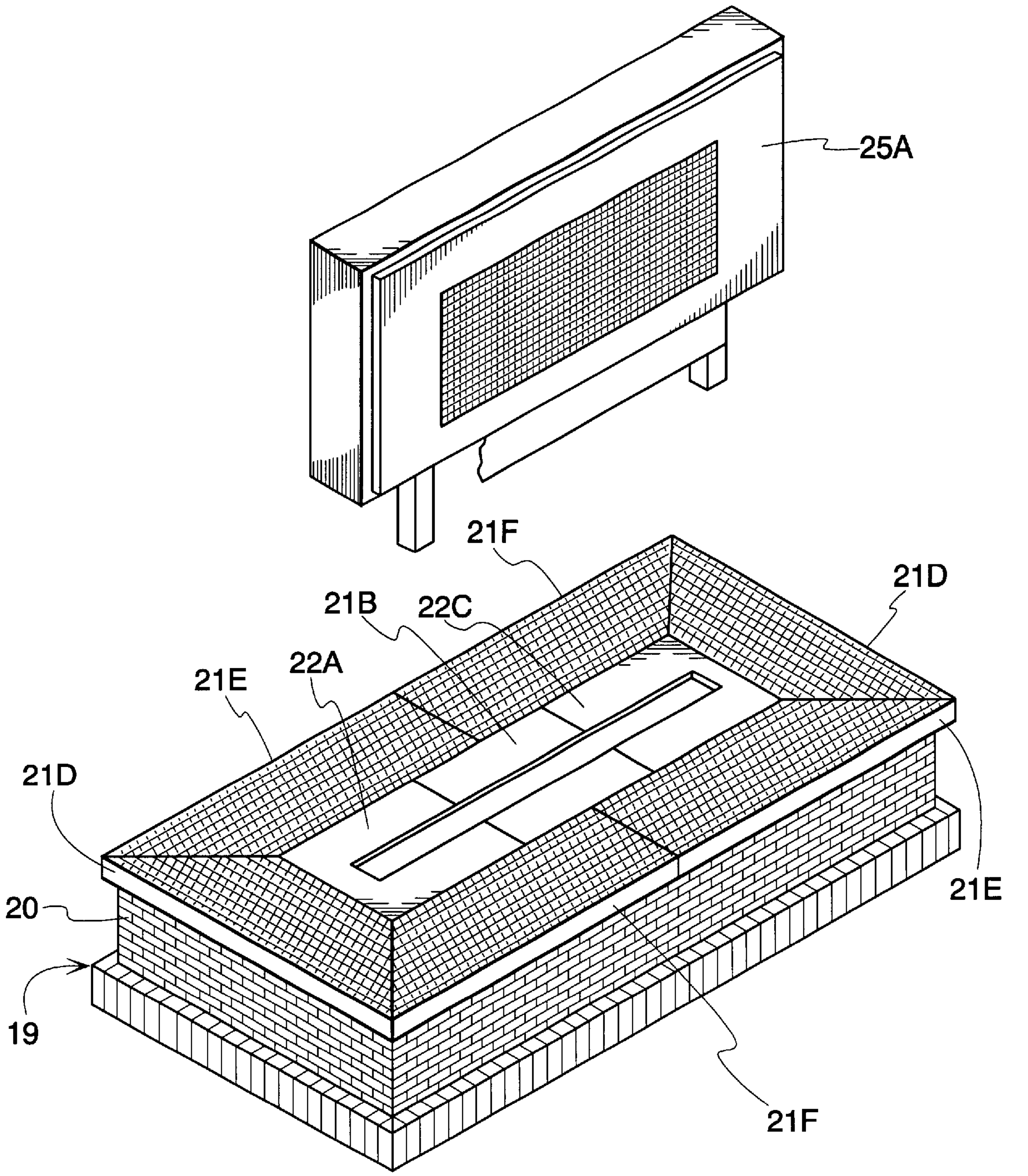
FIG. 3 is an isometric view of an optional solar powered signage assembly.
Figure 7:
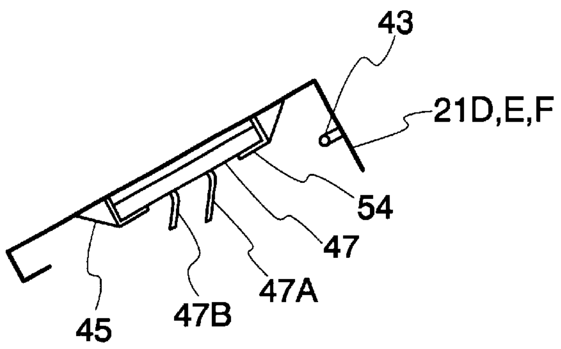
FIG. 7 is a side view of a removable panel showing the capture of a solar cell.
Figure 6:
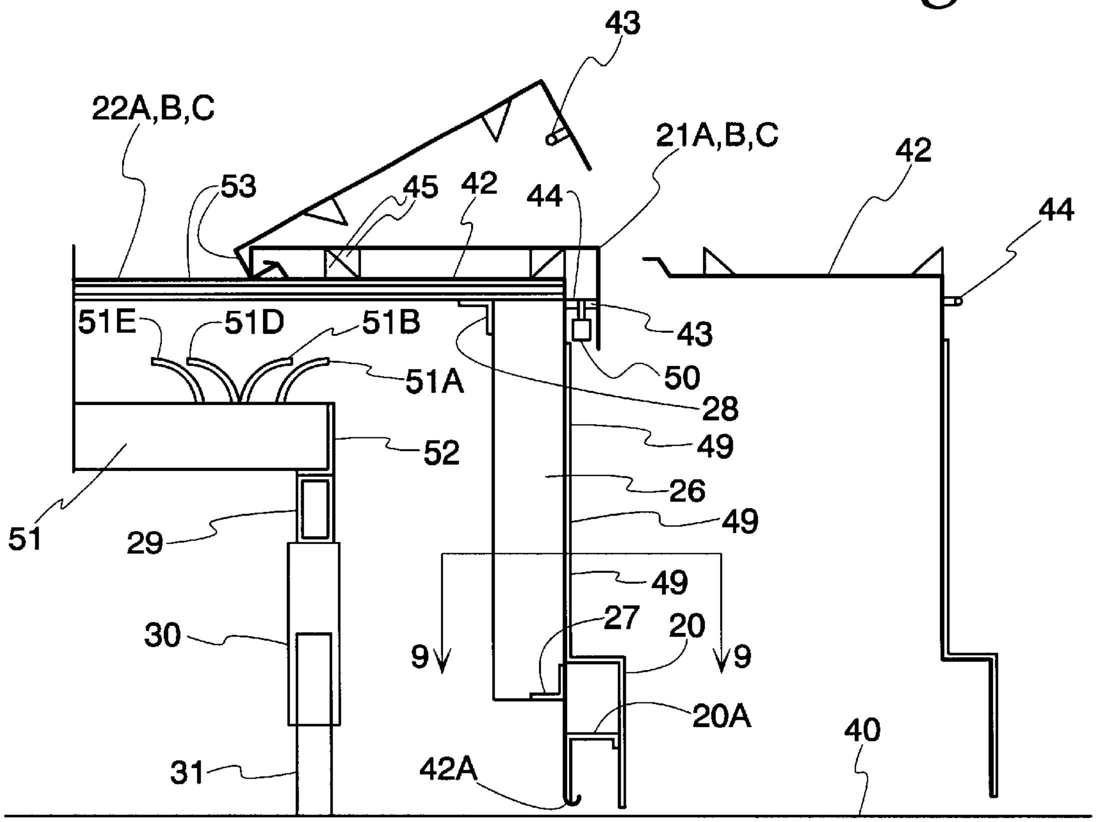
FIG. 6 is a section elevation indicating the removable panels of the base module and the relative location of the battery for the solar powered option.
Figure 9:
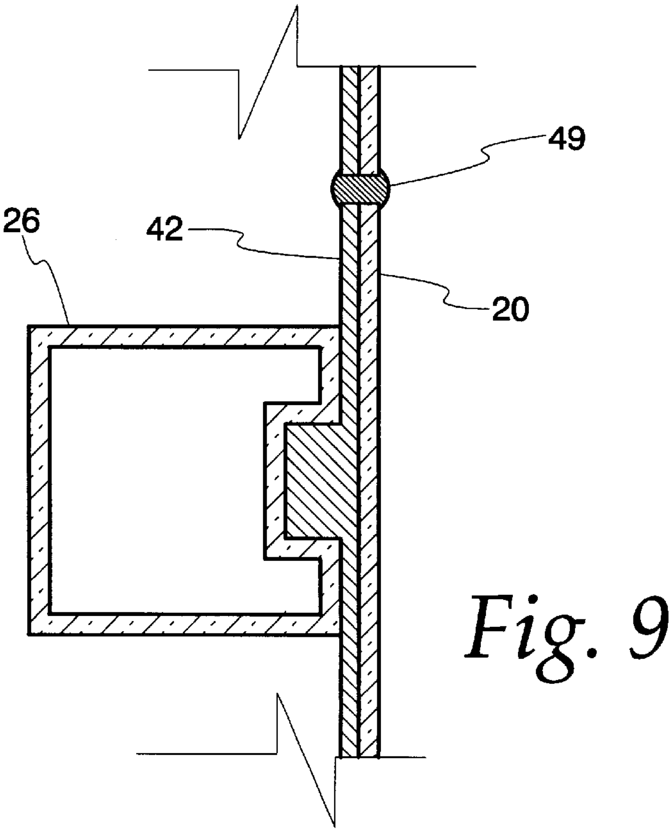
FIG. 9 is a horizontal section taken on line 9—9 of FIG. 6 indicating the attachment of a fascia/fascia panel onto a base module post.

FIG. 6 is a section elevation indicating the removable panel sections 21A, 21B, 21C, and 42 while sections 21D, 21E, 21F are seen in FIG. 3. Fascia support panel 42 is located onto the proper position with base module post 26 by means of a keyed connection as indicated on FIG. 9. FIG. 9 is representative of a section taken on FIG. 6. In addition to the connection of the fascia support panel 42 is the connection of the fascia 20 onto the fascia support panel 42. This is accomplished by a riveted connection 49. The fascia 20 could be of a fiberglass construction or other comparable material. The fascia support panel 42 is of a metal construction or other comparable material. FIG. 6 indicates that panel 42 can be positioned so as to permit pivoting top panel 21 A,B,C to be swung in on top of the panel 42. In the possibility that people would sit on top of 21 A,B,C a positioning and support reinforcement is provided by a complementary arrangement of metal formed seats 45. The metal formed seats 45 would be of a mating triangular seat conformation as shown. There may be any number of shapes other than the triangular seated conformation. The metal formed seats 45 may be of any complimenting arrangement so as to provide positive placement and added support to the mating panel components 21 A,B,C. FIG. 7 is the solar powered pivoting top panel. FIG. 3 represents the contrast in appearance of the solar powered base module's top pivot panels 21D, E, F. It should also be noted that the brick fascia could be provided with both solar powered and non-solar powered signage assemblies. This would reinforce the visual effect of permanence. FIG. 7 indicates the same method of capture of the fascia support panel 42 in that both sets of pivot panels 21 A,B,C and 21D, E, F have the capacity to be locked in place. There are two metal locking tabs 44 that are located in parallel at the indicated location with panel 42. Here as indicated, pivot panels 21 A,B,C, D, E, F are inserted into position in compliment to pivot bar 53 and panel 42. The pivot panel 21 A, B, C, D, E, F can thereby be swung in over fascia support panel 42 having the respective metal formed seats 45 connect. A single metal tab 43 is located onto pivot panel 21 A,B,C, D, E, F so as to knife into place between the two locking tabs located on fascia support panel 42.

Once this knifed meshing of tab 43 into tab position with 44 is established, a padlock 50 can be assigned to the junction. A set of drill through holes will be machined onto the respective metal tabs to accommodate the bar stock diameter of padlock 50. The capture mechanism as just described will hold both panels 21 and 42 in place once padlock 50 is locked.

Figure 8:
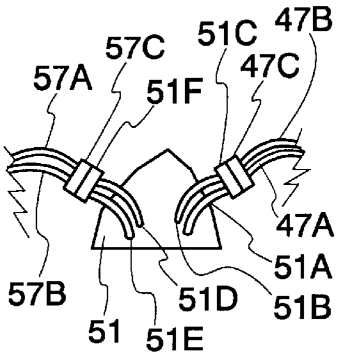
FIG. 8 is a section indicating the electrical leads coming from a solar cell and into a battery and leads coming out and going to a junction box.

FIG. 7 is a working elevation view of the pivot panel for the solar powered unit. A solar panel 47 is held into position by support structural shape 54. Support shape 54 is connected to support seats 45 by means of a welded connection. The solar paneled base module a presented with FIG. 3 contains a top layer of electrical power generating solar cell panels. The arrangement in FIG. 7 provides an ease of changing solar cells in that the cell plates can be slide in and out of the capture as created by structural shape 54. FIG. 7 also indicates two insulated wire conductor connections 47A, 47B. This representation of the battery 51 is only applicable to the solar powered unit as designated with FIG. 3. As indicated with FIG. 8, a socket connection is made for wiring coming in 47A, 47B from the solar cell by means of 47C and 51C. Two insulated wire conductors 51A, 51B lead to a power storage battery 51 as indicated on FIG. 6,. In addinion there is a provision for two insulated wire conductors 51D, 51E leaving the battery. This wiring is connected to a socket 51F, which is in turn connected to socket connection 57C. This establishes power supply to the display junction box 57 by means of two insulated wire conductors 57A, 57B. FIG. 8 is thereby representative of the wiring harness arrangement for the wired powered conductors 47A, 47B, 51A, 51B, 51E, 51F, 57A, 57B. The socket connectors 47C/51C, 51F/57C are of a watertight construction. The socket connectors are commercially procured and maybe of a male/female configuration and would have a plastic weatherproof, housing construction. The insulated wire conductors are constructed of a copper wire gage suitable for service requirements of the designed load demand. The copper wire of the wire conductors are to be encased in a protective dielectric material suitable to provide the protection that would be required as per design requirements.

FIG. 6 also indicates the relative location of the power storage battery as seated in a framed arrangement 52. 52, a structural shape of an aluminum construction or comparable material. The framed arrangement 52 is positioned internal to the base module unit and is assigned to structural shape 29. This connection may be or a welded construction of a threaded fastener group. This battery containment as indicated 51/52 can be easily accessed. Access is accomplished by removing the required 21D, E, F/42 panels and by removing the support access plates 22A,B,C. The access plates 22A,B,C are shown in support of the pivot panel 21A, B, C, D, E, F reference FIG. 6, and are shown in plan view on FIG. 10. The interchangeability of panels as indicated here adds to the modularity of the design. In that not only can base units be changed while keeping the same display module unit, the panel sections can be changed without moving any of the module sub-assemblies.

Figure 10:
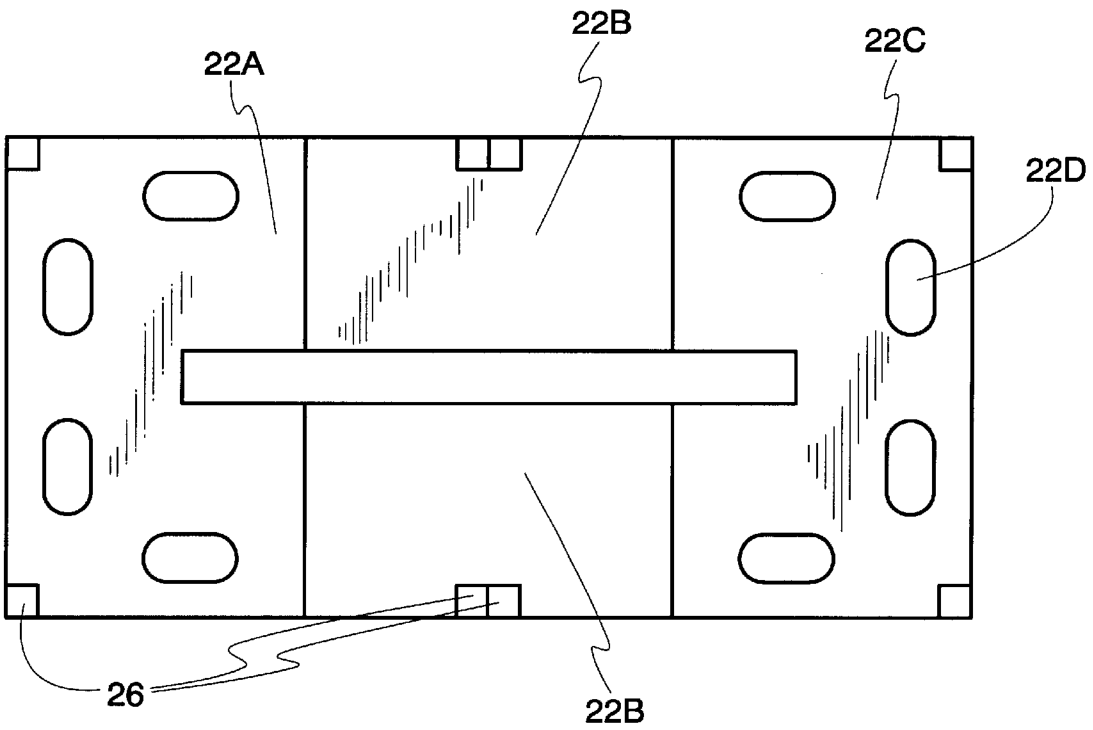
FIG. 10 is a plan view of access support panels of the base module.

FIG. 10 also indicates access slots 22D located on the access panels 22A and 22C. These slots provide access to adjustment handle 35 that provide the change in elevation of the module signage assembly as dictated by the requirements of the installed location. The access panels 22A, 22B, 22C as shown in section elevation FIG. 6 can be of a wooden construction and coated with a water repellent varnish. The access panels could also be of a plastic construction.

FIG. 6 also indicates the fascia 20 connected to the fascia support panel 42. Indicated is a fascia build out support component 20A. The fascia support panel 42 is of a aluminum construction or comparable material. As indicated earlier the fascia 20 along with the fascia support component 20A could be of a fiberglass material or plastic. The fascia support component is a formed rigid component that is configured to attach to and support the fascia panel 20, as indicated.

FIG. 6 indicates a build out fabrication of the fascia panel near the surface of the ground. This build out is used to create an added visual texture such as the vertical soldiering of bricks to the above display of brick rows. The build out may or may not be used. With either case there will be a termination of the fascia 20 or fascia support member 20A into a bent section 42A near to the surface of the ground. The fascia support member 20A can be connected to the fascia 20 by means of a riveted connection.

FIG. 11 indicates the connection of the display unit module 25 to the base unit module 19 by means of a connection of display module columns 23 to structural shape tube member 34. The fastening and removal capability is provided by the fabricated seating arrangement as indicated on FIG. 12. A base plate 23A is connected to the column by means of a welded construction. The base plate 23A will have through holes. The structural shape tube member 34 will have weldment assembly 34A that will be comprised of a set of two structural angle positioned to grip and track onto the structural shape tube member 34 while providing a bearing plate to receive the column base plate 23A.

The bearing plate along with the connecting angle legs will have through holes to complement to the base plate 23A. A fastener group 23B will thereby join the display module columns with the base module unit, to where the display unit can slide into the final position. The sliding function will be provided by the connected weldment 34A. Once final position has been attained weldinent 34A will be welded onto structural tube 34, thereby locking the display module unit to the base module unit 19.

FIG. 11 also indicates the use of fluorescent lighting tubes 58 that are connected to the internal body of the display unit module 25. As indicated before the display unit module is of a translucent plastic construction. The lighting tubes provide light that projects outward to highlight a message outline as scribed on the exterior of the display unit module 25. The lighting tubes can also provide the luminescence to illuminate color filtered messages as connected to the display unit module 25. As seen in FIG. 11, a plurality of precut and positioned characters 61 are appropriately mounted on the display module to provide whatever message is desired by the user.

Commercially procured track and fixtures position the lighting tubes 58. The power supply can be introduced into the display unit module 25 either by an outside power source or by the solar power supply as previously described. In either case power will be brought in at socket connection 57C. Socket connection 57C would be commercially procured and maybe of a male/female configuration and would have a, plastic weatherproof housing construction. Socket connection 57C is connected to insulated wire conductors 57A, 57B. Insulated wire conductors 57A, 57B are thereby fed into a breaker junction box 57. Breaker junction box 57 and all related wiring is obscured from view by display module skirt 24. The display unit module 25 is captured in a position with its center of gravity in close proximity to the center of gravity of the base unit module 19. This fact in conjunction with the wide area displacement of the base module creates an inherent geometry. The inherent geometry of the signage assembly 19/25 along with the load distributing characteristics of the base module unit 19 provide resistance to toppling greater than other mobile sign currently available. The inter-changeable capability of the display unit module 25 and the base unit module 19 give the signage system an adaptability not found with any other permanent signage systems.

Illustrating the "Solar Option" a display module in connection with the solar panel, arrayed base module is shown on FIG. 3, which may be utilized for power for the lighted display This "solar option" would be exercised as a means to conserve commercially procured power or to supply power to locations where power supply is not readily available.

What is claimed is:

1. A display device comprising a signage assembly including a base module having at least two wheeled assemblies for mobility of said display device attached to said base module and a support frame mounted on the base module a display module removably secured to said base module, an electrical power source for said display module for high visibility at all times, and a boxed structural metal fabrication covering said base module and extending so as to be located adjacent the surface on which the device is supported and to cover the wheeled assemblies to promote a visual effect of a permanent sign construction, the boxed structural metal fabrication including a plurality of support panels and a plurality of removable veneer panels, said support panels capable of receiving and holding in place said veneer panels so as to suggest visual permanence.

2. A display device as set forth in claim 1, in which said electric power source comprises a solar power supply generated by a plurality of solar cells and battery pile positioned within said base module.

3. A display device as set forth in claim 1, in which said support panels are of metal construction and said veneer panels are metal cap panels painted to appear as concrete block or cut stone.

4. A display device as set forth in claim 1, in which said support panels are a metal construction and said veneer panels are plastic molded ceramic side panels having the appearance of brick or other masonry.

5. A display device as set forth in claim 1, in which said base module includes a plurality of post mechanisms providing height adjustment, and an electric power coupling adapted to be connected to a remote source.

6. A display device as set forth in claim 1, in which said display module includes a translucent plastic housing and an electrically powered array of fluorescent tubes, a plurality of precut and positioned characters on said housing, said tubes being positioned to provide proper lighting to illuminate said housing and characters on said sign.

7. A display device as set forth in claim 6, in which said characters are illuminated by said tubes to provide a message.

8. A display device as set forth in claim 1, in which said veneer panels include a vertical side wall and a top horizontal portion that is hinged onto the support frame.

9. A display device as set forth in claim 8, in which said support panels are pivotally mounted on said support frame to provide top support reinforcement for seating thereon.

* * * * *